Sept. 18, 1934.   L. H. MIDDLETON   1,974,341
LAMP
Filed May 1, 1934
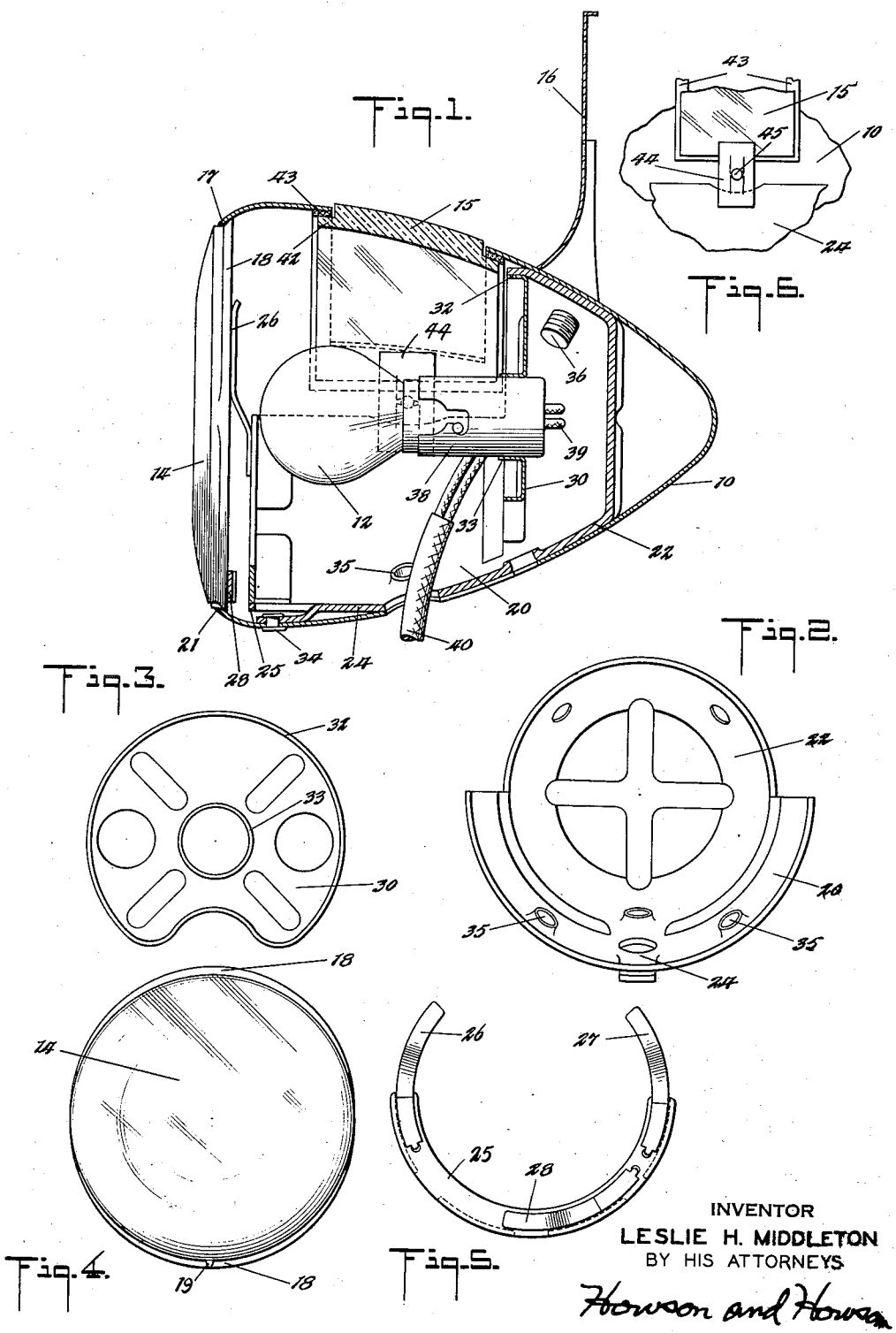
INVENTOR
LESLIE H. MIDDLETON
BY HIS ATTORNEYS
Howson and Howson Patented Sept. 18, 1934

1,974,341

UNITED STATES PATENT OFFICE 1,974,341

LAMP

Leslie H. Middleton, La Crosse, Wis., assignor to Moto Meter Gauge & Equipment Corporation, La Crosse, Wis., a corporation of Delaware Application May 1, 1934, Serial No. 723,416

10 Claims. (Cl. 240—8.3)

This invention relates to automobile tail lamps of the type comprises a shell with an electric lamp bulb mounted therein and having an opening provided with a lens through which light from the lamp shines, the lens being bodily removable to permit replacement of the lamp bulb.

The main objects of the invention are to improve the mounting for the removable lens, and to improve the reinforcement for the shell and the mounting for the lamp bulb.

Other objects will be apparent from the following description and the accompanying drawing, in which Figure 1 is a vertical longitudinal section through an automobile tail lamp according to the preferred embodiment of the present invention;

Fig. 2 is a front elevation of the reinforcing liner, with the spring supporting flange removed;

Fig. 3 is a similar view of the bracket plate which supports the lamp socket;

Fig. 4 is a front elevation of the lens removed from the lamp;

Fig. 5 is a front elevation of the lens retaining springs and supports therefor, and Fig. 6 is a fragmentary view of the inside of the casing showing a detail of a fastening device.

The automobile tail lamp according to the present invention comprises essentially a shell 10 in which is mounted an electric light bulb 12. The end of the casing 10 is open and receives a lens 14 through which light from the lamp bulb 12 shines. In the form shown, a second opening is provided and fitted with a window 15, through which light from the bulb 12 shines onto a license plate, or the like, carried by a bracket 16.

The shell 10 is preferably of conoidal form, for decreasing wind resistance and constructed of relatively thin non-ferrous sheet metal which can be satisfactorily electroplated with nickel or chromium so as to present an attractive external finish. The open end of the casing 10 is rolled or spun inward, to form an inwardly extending annular rim 17. The lens 14 extends through this end opening, and is provided with a flange comprising lobes 18 which engage the rim 17, to retain the lens in position.

The shell is provided with a reinforcing liner 20, of ferrous or other strong and inexpensive metal and preferably of a thicker gauge than the shell 10. The liner 20 is preferably stamped from sheet metal in such a manner as to form a cup portion 22, which fits within and substantially conforms to the inner end of the conoidal shell.

The liner 20 has an extension 24 which substantially conforms to the inside of the shell opposite the window 15, being substantially the lower half of the conoidal shell. This extension 24 terminates in an inwardly extending flange 25 on which are mounted leaf springs 26, 27 and 28.

Referring again to Fig. 4, the lobes 18 form a flange substantially in the form of an ellipse circumscribed about the lens 14. This lens may be introduced into the casing by tilting the same, pressing the upper part inwardly and passing it through the opening in the rim 17. This is possible without distorting the rim 17, because the flange 18 reaches zero at the horizontal diameter of the lens. Of course, the leaf springs 26 and 27 must be compressed in order that the upper flange 18 may enter the casing. The upper portion of the lens 14 is now pushed upward inside the rim 17, sufficiently to permit the lower flange 18 to clear the rim at the bottom. The lower part of the lens 14 is then pushed inwardly, compressing the spring 28, until the lower flange 18 comes inside the rim 17. The lens 14 is now pushed downwardly to cause the lower flange 18 to lie within the rim 17. This brings the lens to the position shown in Figure 1, in which it is held by the springs 26, 27 and 28. A fin 19 on the lens engages a notch 21 in the rim, for centering the parts.

In the manufacture of the lamp, the liner 20 is preferably stamped out as a unit. A bracket plate 30 is also stamped out as a unit, having an external flange 32 and an internal flange 33. The external flange 32 is preferably welded within the outer flange of the cup portion 22, the rim of the flange substantially aligning with the rim of the upper edge of the cup portion 22.

The insert thus constructed is then placed inside the casing and a hollow rivet 34 is applied to hold the parts together. The liner 20 is provided with several threaded bosses 35 adapted to receive screws which pass through registering holes in the casing. As shown in Figure 1, screws 36 pass through the registering holes in the bracket 16, the casing 10, and the threaded boss in the cup portion 22.

A lamp socket 38 for supporting the lamp bulb 12 passes through a central opening in the bracket plate 30 and engages the flange 33, being preferably welded thereto. Wires 39 from the lamp socket pass through an opening in the plate 30, and a cable 40 containing these wires passes through registering openings in the liner extension 24 and the casing 10.

The glass window 15 has a flange 42 engaging a gasket 43. The window is held in position compressing the gasket, by a clip or nut 44, shown in Fig. 6. One side of the clip 44 engages the extension 24 of the liner, and the other side of which engages the flange 42 of the window glass. A screw 45 passing through the shell 10 engages the nut 44 and clamps the parts in position.

The invention embraces such embodiments of the disclosed ideas as fall within the scope of the appended claims.

I claim:

1. A lamp comprising a shell having a rim, a circular lens fitting said rim and having a flange underlying said rim and substantially in the form of an ellipse circumscribing the circle of said lens, and spring means within said shell urging said lens outwardly through said rim and also urging said flange against said rim.

2. A lamp comprising a shell having a rim, a lens fitting said rim and having a flange underlying the same, a reinforcing liner for said shell, a lamp support rigidly mounted on said liner, and spring means on said liner engaging said lens.

3. A lamp comprising a shell having a window in one end and a lateral window intermediate its ends, said end window having a lens with a flange engaging a rim of said shell, a reinforcing liner for the opposite end of said shell having an extension reinforcing the side of said shell opposite said lateral window, and spring means on said extension engaging said lens.

4. A lamp comprising a shell having a window in its larger end and a lateral window intermediate its ends, a reinforcing liner substantially lining the smaller end of said shell, one side thereof extending toward the larger end and substantially lining the side of said shell opposite said lateral window.

5. A lamp comprising a shell having a window in one end, and a lateral window intermediate its ends, a reinforcing liner for said shell, a transverse plate secured to said liner adjacent said lateral window, and a lamp socket mounted on said plate.

6. A lamp comprising a substantially conoidal shell having a coaxial window in its larger end and a lateral window intermediate its ends, a reinforcing liner for said shell comprising a cup substantially lining the smaller end of said shell and having an extension substantially lining the remaining side of said shell opposite said lateral window, a transverse plate having a peripheral flange secured to said cup adjacent said lateral window, said plate having a flanged opening, and a lamp socket mounted in said opening.

7. A lamp comprising a shell having a window in one end thereof, a reinforcing liner substantially lining the other end of said shell, a lamp support secured to said liner, said liner having threaded internal bosses and said shell having registering apertures, and screws passing through said apertures and engaging said bosses for supporting the whole.

8. A lamp comprising a shell having a lateral aperture, a light transmitting closure therefor, a reinforcing liner substantially lining one end of said shell and having an extension substantially lining the side of said shell opposite said lateral window.

9. A lamp comprising a shell having a lateral aperture, a light transmitting closure therefor, a reinforcing liner substantially lining one end of said shell and having an extension substantially lining the side of said shell opposite said window, and means cooperating with said extension and engaging said closure for holding it in position with respect to said aperture.

10. A lamp comprising a substantially conoidal shell having a rim, a lens having a flange fitting said rim, said shell having a lateral aperture, a light transmitting closure for said aperture, a reinforcing liner for said shell comprising a cup substantially lining the smaller end of said shell and having an extension substantially lining the remaining side of said shell opposite said lateral window, a transverse plate marginally secured to said cup adjacent said lateral window, a lamp socket mounted on said plate, and springs on said liner extension urging said flange against said rim.

LESLIE H. MIDDLETON.